(12) United States Patent
Hatakeyama et al.

(10) Patent No.: US 8,266,117 B2
(45) Date of Patent: Sep. 11, 2012

(54) METHOD AND APPARATUS FOR TRACING DATA IN AUDIT TRAIL, AND COMPUTER PRODUCT

(75) Inventors: Takahisa Hatakeyama, Kawasaki (JP);
Junichi Koizumi, Kawasaki (JP);
Hidetada Anan, Kawasaki (JP); Hiroshi Matsunaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1315 days.

(21) Appl. No.: 11/360,395

(22) Filed: Feb. 24, 2006

(65) Prior Publication Data
US 2007/0011303 A1 Jan. 11, 2007

(30) Foreign Application Priority Data
Jul. 11, 2005 (JP) ................................. 2005-202352

(51) Int. Cl.
*G06F 17/30* (2006.01)
(52) U.S. Cl. ....................................... 707/694; 707/758
(58) Field of Classification Search .................. 707/694, 707/758
See application file for complete search history.

(56) References Cited

U.S. PATENT DOCUMENTS

| | | | | |
|---|---|---|---|---|
| 6,056,786 A | * | 5/2000 | Rivera et al. .................. | 717/168 |
| 6,148,342 A | * | 11/2000 | Ho ................................ | 709/225 |
| 6,405,318 B1 | * | 6/2002 | Rowland ......................... | 726/22 |
| 7,373,330 B1 | * | 5/2008 | Klebe .............................. | 705/51 |
| 7,463,590 B2 | * | 12/2008 | Mualem et al. ................ | 370/241 |
| 2005/0091145 A1 | * | 4/2005 | Baker et al. .................... | 705/37 |
| 2005/0240670 A1 | * | 10/2005 | Cheng ............................ | 709/227 |

FOREIGN PATENT DOCUMENTS

| | | |
|---|---|---|
| JP | 2003-76662 | 3/2003 |
| JP | 2004-21549 | 1/2004 |
| JP | 2007-048266 | 2/2007 |

OTHER PUBLICATIONS

Japanese Office Action issued Aug. 23, 2011 in related Japanese Application No. 2006-096056 (2 pages) (2 pages English Translation).

* cited by examiner

*Primary Examiner* — Son T Hoang
(74) *Attorney, Agent, or Firm* — Staas & Halsey LLP

(57) ABSTRACT

In an information system, a web server records web access logs of a client outside of a LAN. A mail server records transmission/reception logs of e-mails. A DB server records access right operation logs. A task application server records DB access log. An administrative server collects logs recorded in the web server, the mail server, the DB server, and the task application server, and operation logs of the client terminals to trace a person and an operation related to information leakage using the collected logs.

9 Claims, 13 Drawing Sheets

FIG.9

| | OPERATION MARK TABLE | |
|---|---|---|
| a | STORING DATA FILE IN BROWSER, ETC. (STORAGE DESTINATION IS A REMOVABLE DISK.) | 10 |
| b | STORING DATA FILE IN BROWSER, ETC. (STORAGE DESTINATION IS NOT A REMOVABLE DISK.) | 5 |
| c | PRINTING | 8 |
| d | COPYING AND PASTING CLIP BOARD | 4 |
| e | TRANSMITTING E-MAIL | 3 |
| f | TRANSMITTING E-MAIL WITH ATTACHED FILE | 5 |
| g | UPLOADING FILE BY HTTP/FTP | 5 |

FIG.10

| COMBINED OPERATIONS MARK TABLE | |
|---|---|
| b→f | 3 |
| b→g | 3 |
| d→e | 3 |
| d→f | 3 |
| d→g | 3 |

| WEIGHTED COEFFICIENT TABLE | |
|---|---|
| MIDNIGHT AND HOLIDAYS | 1.5 |
| WITHIN OVERTIME WORK HOURS | 1.2 |
| WITHIN BUSINESS HOURS | 1.0 |

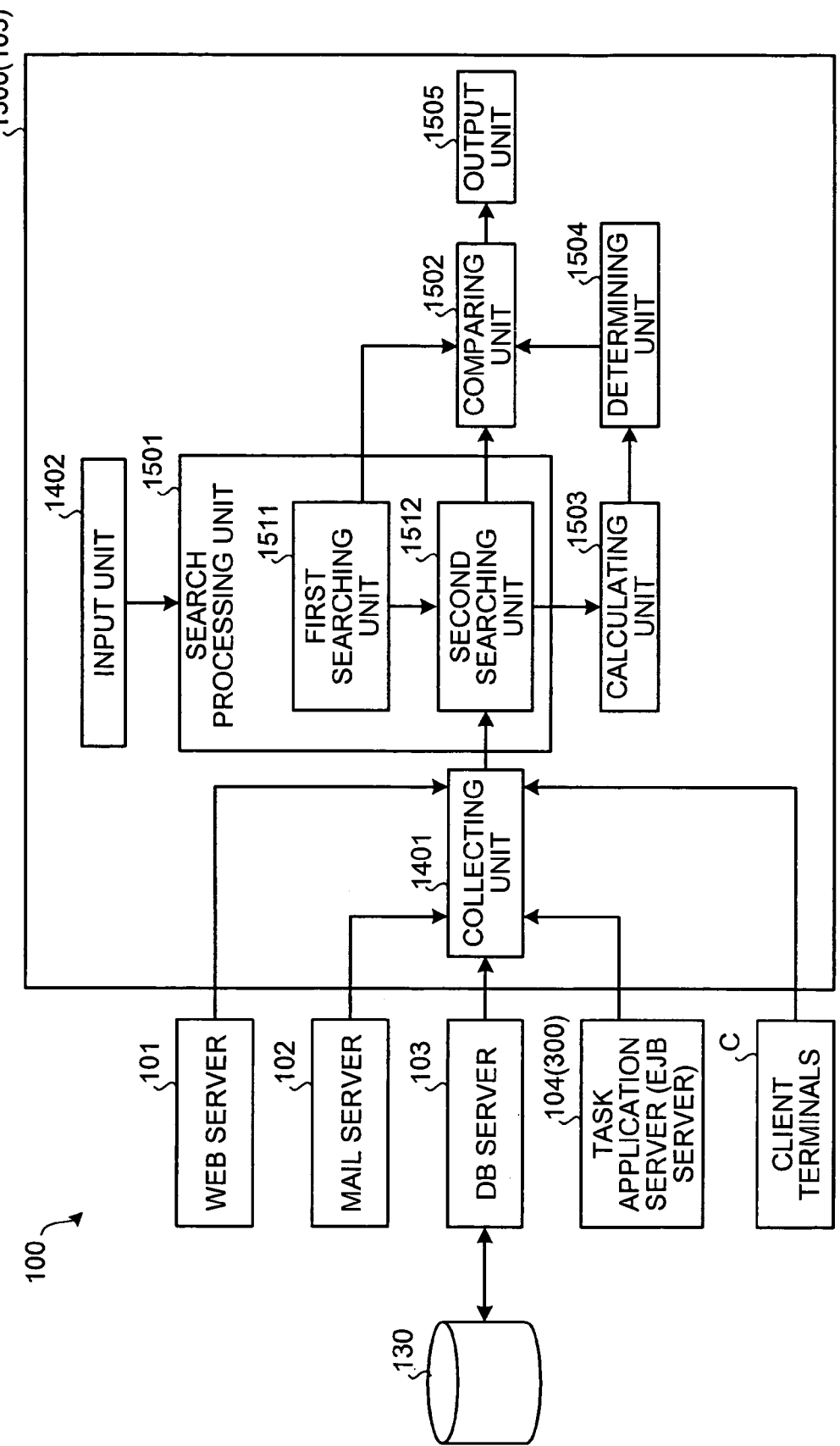

METHOD AND APPARATUS FOR TRACING DATA IN AUDIT TRAIL, AND COMPUTER PRODUCT

CROSS-REFERENCE TO RELATED APPLICATIONS

This application is based upon and claims the benefit of priority from the prior Japanese Patent Application No. 2005-202352, filed on Jul. 11, 2005, the entire contents of which are incorporated herein by reference.

BACKGROUND OF THE INVENTION

1. Field of the Invention

The present invention relates to a technology for tracing data in an audit trail in an information system.

2. Description of the Related Art

An audit trail is practiced for ex post facto verification in an audit of an information system. In it is verified whether each control function in the information system has functioned properly in terms of securing reliability, safety, and efficiency of the information system. For example, a log of manipulation of information (sending out/printing), authentication, and access to a database is utilized.

In recent years, collection and analysis of logs as an audit trail have become important as countermeasures against information leakage under the privacy protection law and the corporate reform law. The logs are collected from personal computers (PC) and various servers, and a person that has leaked information can be traced by searching the collected logs. Such a technology is disclosed in, for example, Japanese Patent Application Laid-Open Publication No. 2003-076662.

However, a type and a recording form of the logs differ according to an operation system (OS) and an application in terms of grammar and meaning, and have no consistency. Therefore, the log collection itself is not easy and analysis of the collected logs is even more difficult.

For example, in an information system that searches customer information, accesses to a database server that stores customer information sometimes apply a system ID issued by a task application server that executes the search processing in the information system. In such a case, it is difficult to trace which one of users has made accesses to the database server only with the logs stored in the database server.

To trace the logs to audit over the entire information system, accurate grasp of the flow of information over the entire information system is essential. However, tracing and analyzing the logs are getting more difficult because the flow of information becomes more complicated in an information system as a scale of the information system becomes larger.

A conventional user ID is different in allocation by domain of each task application and each PC. However, tracing across the domains of task applications and PCs is impossible.

As described above, in conventional method of administration of the audit trail, the important security requirements such as collection and analysis of logs are not satisfied. Therefore, tracing of information leakage over the entire information system is difficult and the effect of blocking the information leakage can not be substantially obtained.

SUMMARY OF THE INVENTION

It is an object of the present invention to at least solve the above problems in the conventional technology.

An apparatus for performing an audit trail according to one aspect of the present invention includes a receiving unit configured to receive a search condition for tracing target data stored in a database; a first searching unit configured to search, from among access logs that are recorded when an access to the database is made, a first log record that is an access log that meets the search condition; an origin identifying unit configured to identify, based on the first log record, an access origin from which an access to the target data has been possible at a time identical to time and date recorded in the first log record; a second searching unit configured to search, from among log records of the access origin, a second log record corresponding to the first log record; and a client identifying unit configured to identify a client that has made the access to the target data, based on the second log record.

An apparatus for performing an audit trail according to another aspect of the present invention includes a receiving unit configured to receive a search condition for tracing target data stored in a database; a first searching unit configured to search, from among access logs that are recorded when an access to the database is made, a first log record that is an access log that meets the search condition; a second searching unit configured to search, from among operation logs of a client, a second log record that is an operation record of which a recording time corresponds to a recording time of the first log record; a comparing unit configured to compare client information indicative of a client included in the first log record and the client information included in the second log record; and an output unit configured to output a result of tracing the target data based on a result of comparison by the comparing unit.

A method for performing an audit trail according to still another aspect of the present invention includes receiving a search condition for tracing target data stored in a database; searching, from among access logs that are recorded when an access to the database is made, a first log record that is an access log that meets the search condition; identifying, based on the first log record, an access origin from which an access to the target data has been possible at a time identical to time and date recorded in the first log record; searching, from among log records of the access origin, a second log record corresponding to the first log record; and identifying a client that has made the access to the target data, based on the second log record.

A method for performing an audit trail according to still another aspect of the present invention includes receiving a search condition for tracing target data stored in a database; searching, from among access logs that are recorded when an access to the database is made, a first log record that is an access log that meets the search condition; searching, from among operation logs of a client, a second log record that is an operation record of which a recording time corresponds to a recording time of the first log record; comparing client information indicative of a client included in the first log record and the client information included in the second log record; and outputting a result of tracing the target data based on a result of comparison at the comparing.

A computer-readable recording medium according to still another aspect of the present invention stores therein a computer program for realizing a method for performing an audit trail according to the above aspects.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a table of a mark allocation of suspicion degree of operations;

FIG. 10 is a table of a mark allocation of suspicion degree for consecutive operations;

FIG. 15 is a block diagram of the audit-trail tracing apparatus.

DETAILED DESCRIPTION OF THE PREFERRED EMBODIMENTS

Exemplary embodiments of the present invention will now be described in detail with reference to the accompanying drawings.

Figure 1:
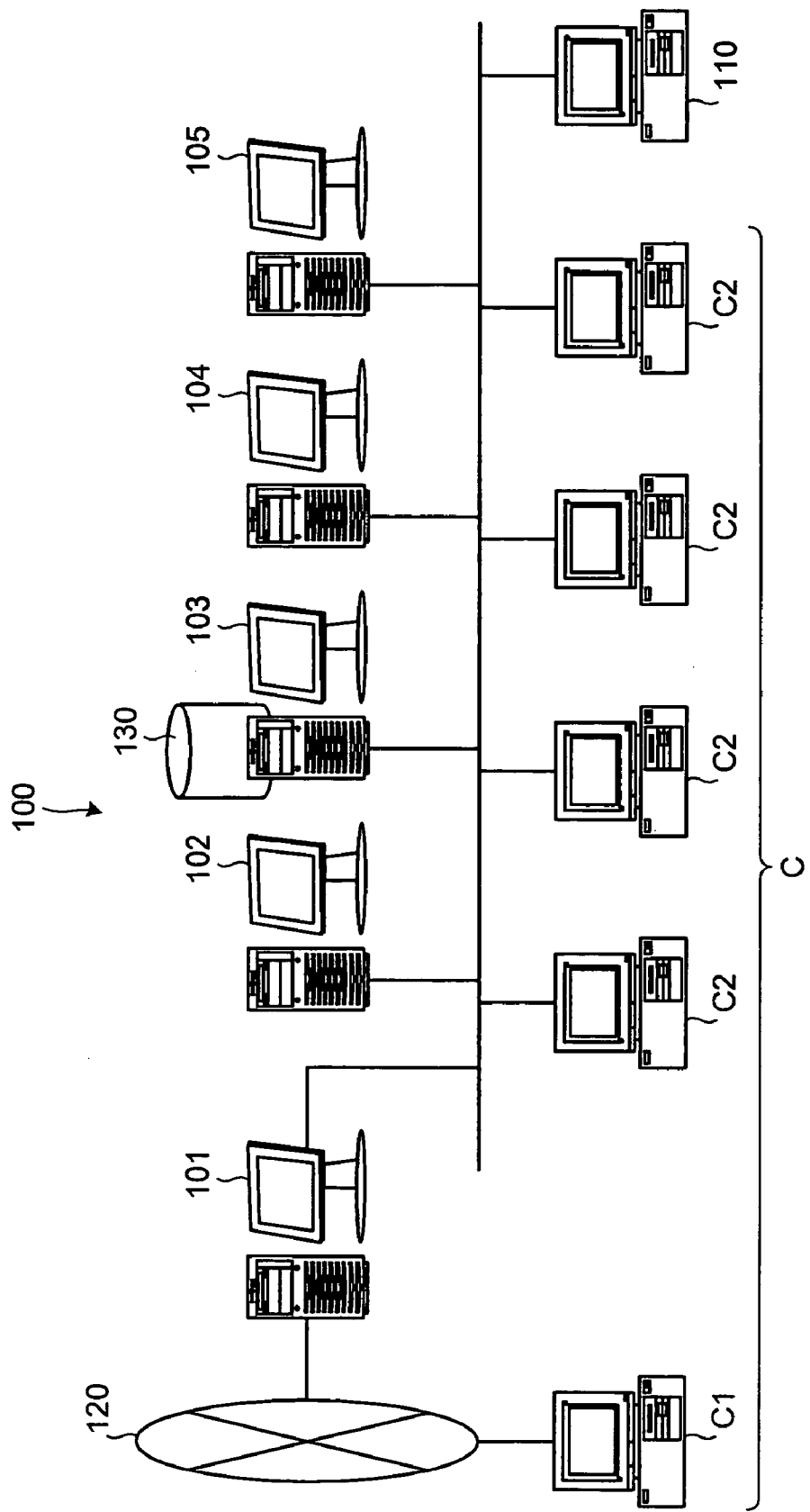
FIG. 1 is a schematic of an information system according to an embodiment of the present invention.

FIG. 1 is a schematic of an information system according to the embodiment of the present invention. An information system 100 includes a web server 101, a mail server 102, a database (DB) server 103, a task application server 104, an administrative server 105, client terminals "C", and an administrator terminal 110 to form a wide area network (WAN). For example, a customer information searching system can be listed as the information system 100.

The web server 101 provides predetermined services to a client terminal C1 that has made an access through the Internet 120 to the web server 101, and records web access logs with the client terminal C1 outside a local area network (LAN). The mail server 102 administers transmission and reception of an e-mail, and executes transmission and reception of an e-mail among the client terminals C. The mail server 102 records transmission/reception logs of e-mails.

The DB server 103 administers a DB 130. In the DB 130, various kinds of information retained by the information system 100 is stored. For example, when the information system 100 is a customer information searching system, customer information is stored in the DB 130. The DB server 103 provides requested information in response to accesses from the client terminals C, the administrator terminal 110, or the task application server 104. The DB server 103 records access right operation logs for these accesses.

The task application server 104 executes tasks provided by the information system 100. For example, when the information system 100 is a customer information searching system, when a search request is received directly from one of client terminals C2 or indirectly through the web server 101 from the client terminal C1, the task application server 104 executes the search process of the customer information to the DB server 103 and provides a result of the search to the client terminals C. The task application server 104 records DB access logs relating to the search requests and the result of the search processes.

The administrative server 105 administers the logs that are audit trails in the information system 100. The administrative server 105 is operated from the administrator terminal 110. Specifically, the administrative server 105 collects logs recorded in the web server 101, the mail server 102, the DB server 103, and the task application server 104, and operation logs of the client terminals C to trace a person that has leaked information and information leakage-related operation history of the client terminals C using the collected logs.

The client terminals C and the administrator terminal 110 receive services provided by the web server 101, the mail server 102, the DB server 103, and the task application server 104. For example, the client terminal C1 outside the LAN can make accesses through the web server 101 to the mail server 102, the DB server 103, and the task application server 104.

The client terminal C2 on the LAN and the administrator terminal 110 can make accesses to the web server 101, the mail server 102, the DB server 103, and the task application server 104. The administrator terminal 110 can make accesses additionally to the administrative server 105. The operation logs of the client terminals C and the administrator terminal 110 are collected by the administrative server 105.

Figure 2:
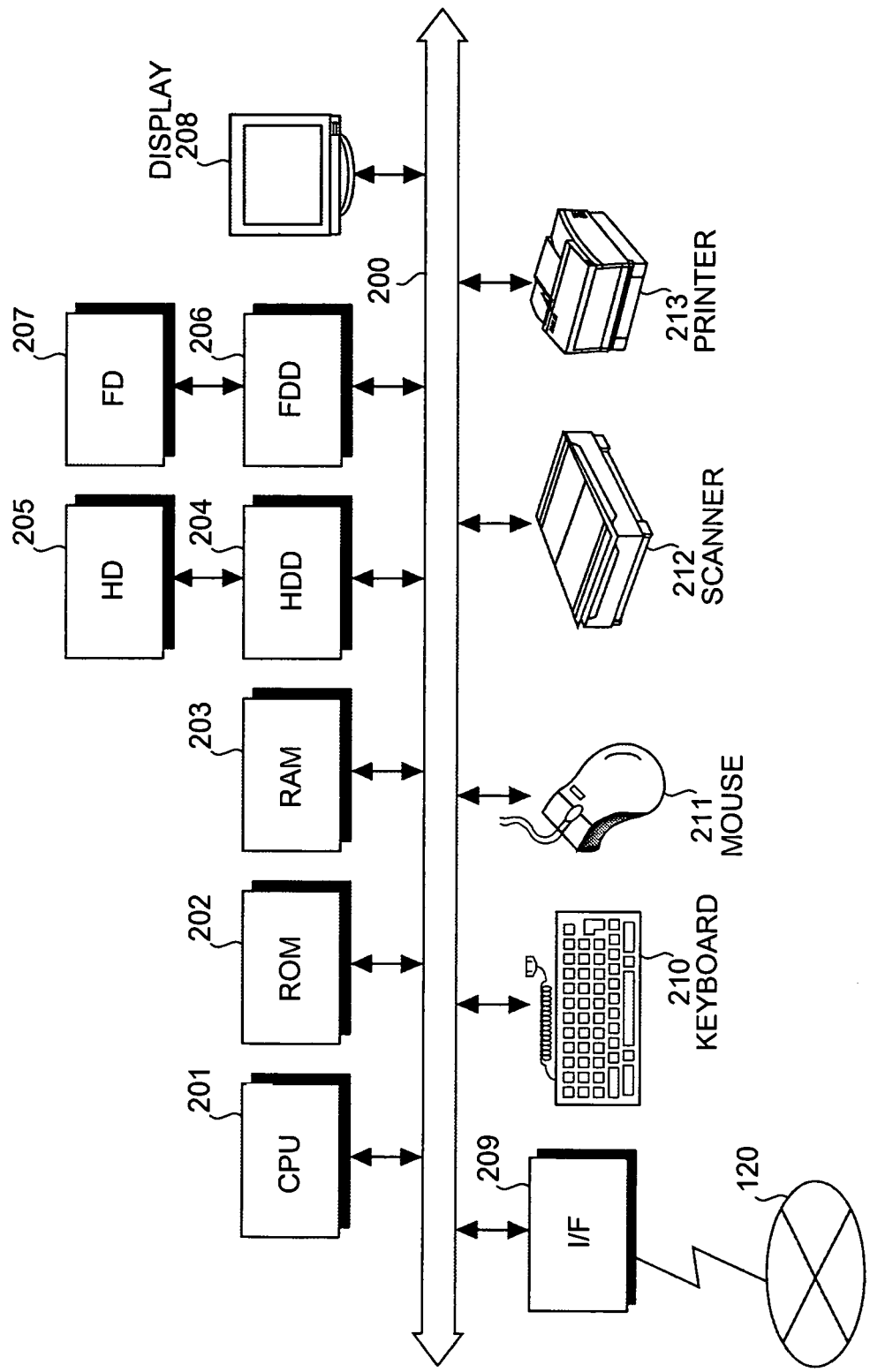
FIG. 2 is a schematic of a hardware configuration of a computer shown in FIG. 1.

FIG. 2 is a schematic of a configuration of each computer shown in FIG. 1. The computer includes a central processing unit (CPU) 201, a read-only memory (ROM) 202, a random-access memory (RAM) 203, a had disk drive (HDD) 204, a had disk (HD) 205, a flexible disk drive (FDD) 206, a flexible disk (FD) 207 as an example of a removable recording medium, a display 208, an interface (I/F) 209, a keyboard 210, a mouse 211, a scanner 212, and a printer 213. Each component is connected via a bus 200.

The CPU 201 controls the whole of the delay analysis apparatus. The ROM 202 stores programs such as a boot program. The RAM 203 is used as a work area of the CPU 201. The HDD 204 controls read/write of data from/to the HD 205 in accordance with a control of the CPU 201. The HD 205 stores data written by the HDD 204.

The FDD 206 controls read/write of data from/to the FD 207 in accordance with a control of the CPU 201. The FD 207 stores data written by the FDD 206 and allows the delay analysis apparatus to read the data stored in the FD 207.

As a removable recording medium, besides the FD 207, a compact-disc read-only memory (CD-ROM), a compact-disc recordable (CD-R), a compact-disc rewritable (CD-RW), a magneto-optical disk (MO), a digital versatile disk (DVD), or a memory card may be used. The display 208 displays a cursor, icons, and tool boxes as well as data such as a document, an image, and function information. As the display 208, a cathode-ray tube (CRT), a thin-film-transistor (TFT) liquid-crystal display (LCD), and a plasma display may be used.

The I/F 209 is connected, via a communication line, to a network such as the Internet 120, and is connected to other apparatuses via the network. The I/F 209 functions as an interface between the network and the apparatus, and controls input/output of data from/to an external apparatus. As the I/F 209, a modem, and a LAN adaptor may be used.

The keyboard 210 includes keys for inputting characters, numerals, and various instructions, and inputs various data to the apparatus. A touch-panel type input pad, and a numeric keypad may be also used instead. With the mouse 211, shift of a cursor, selection of an area, change of a position and a size of a window are performed. A trackball or a joystick may be used instead, as long as similar functions are provided as a pointing device.

The scanner 212 optically reads an image and captures image data into the delay analysis apparatus. The scanner 212 may have an optical character reader (OCR) function. The printer 213 prints image data and document data. As the printer 213, a laser printer or ink-jet printer may be used.

Figure 3:
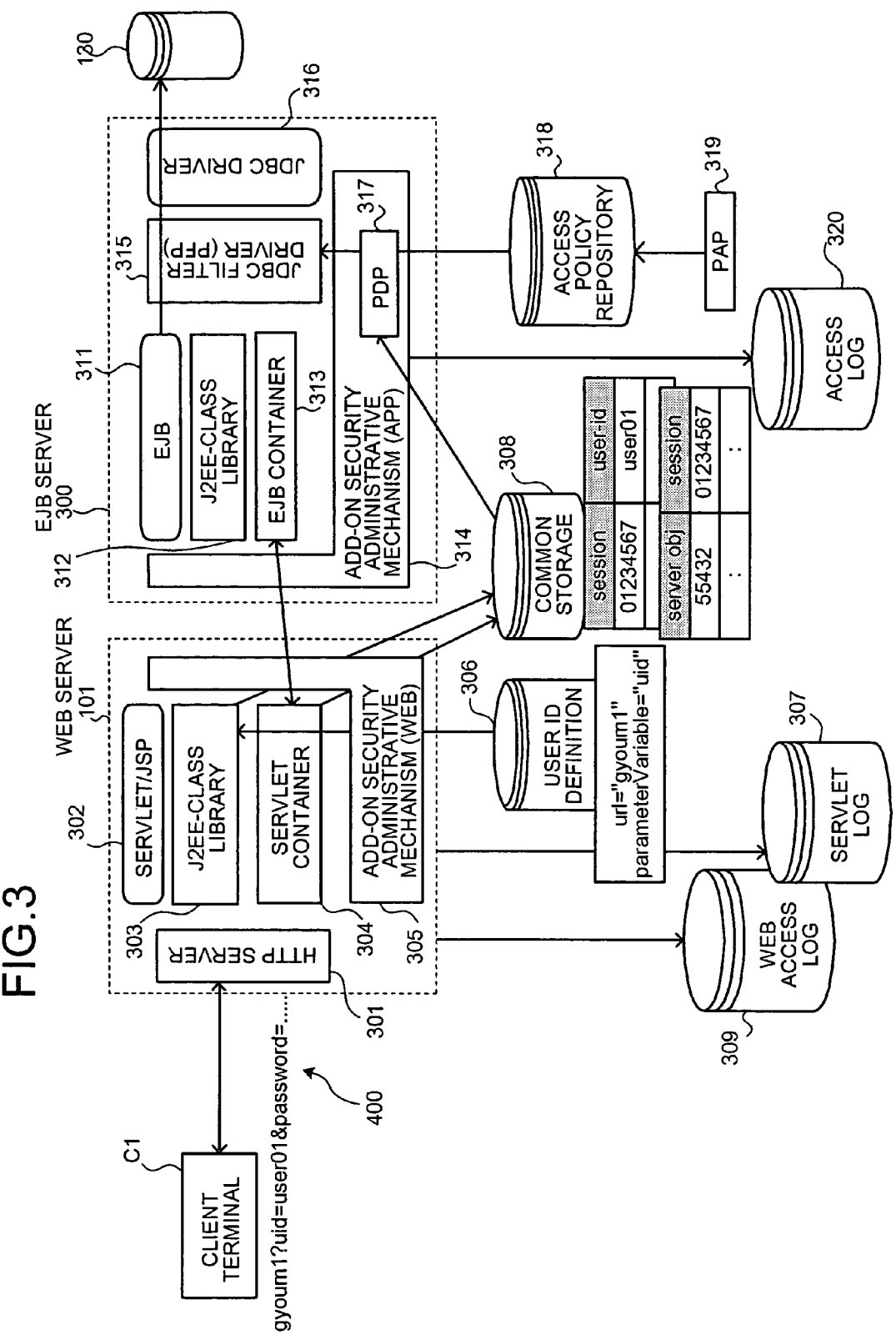
FIG. 3 is a schematic of the information system according.

FIG. 3 is a schematic of the information system 100. An EJB server 300 is a computer corresponding to the task application server 104 shown in FIG. 1.

In FIG. 3, web server 101 includes a hyper-text protocol (HTTP) server 301, a servlet 302, a java 2 enterprise edition (J2EE)-class library 303, a servlet container 304, and an add-on security-administrative mechanism 305. The HTTP server 301 monitors a user authentication request 400 (HTTP request) from the client terminal C1.

Figure 4:
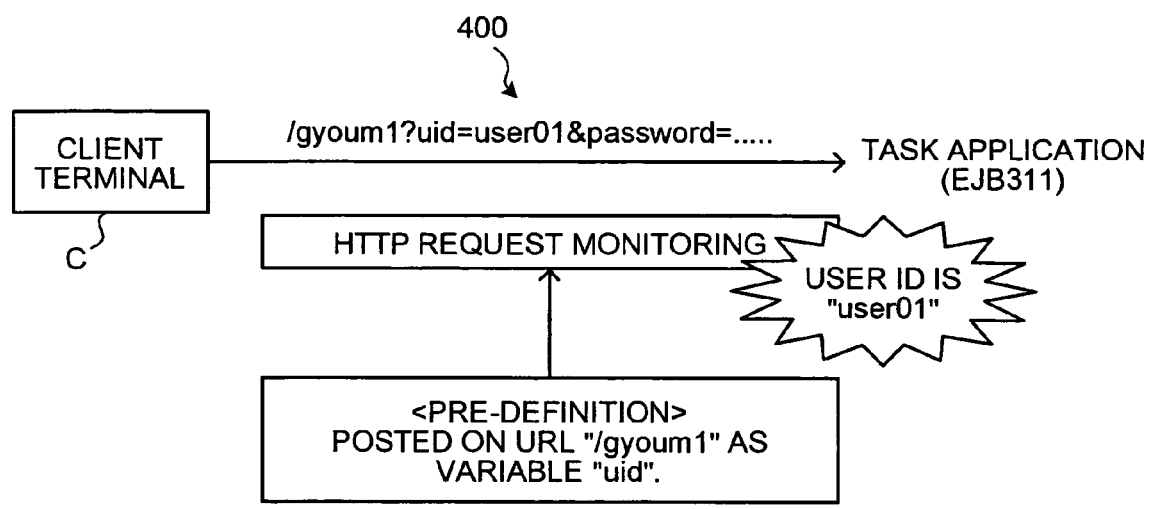
FIG. 4 is a schematic for illustrating a user authentication request.

FIG. 4 is a schematic for illustrating the user authentication request 400. Acquisition of a user ID from one of the client terminals C is easy for an application that utilizes a platform-standard authentication mechanism (a basic authentication). However, most of task applications incorporates an authentication mechanism unique to itself. In this case, the acquisition is realized as follows because only an application layer recognizes the user ID.

In the user authentication request 400 from the client terminal C, a uniform resource locater (URL) that posts the user ID, and query information have been defined in advance respectively for each task application. The user authentication request 400 (HTTP request) is monitored at a servlet-class library level, thereby, the user ID is acquired and is recorded correlating the user ID with session identifying information.

That is, the user authentication request 400 is query information in the HTTP format and including identifying information of the task application ("gyoum1" shown in FIG. 4) and variables ("uid" shown in FIG. 4). As the variables, for example, the user ID ("user01" shown in FIG. 4) and a password ("password" shown in FIG. 4) are input. As far as authentication is executed, inserting a user ID in an HTTP request in some form can be expected at a high probability. Therefore, this approach can cover the large majority of existing task applications and can supports widely from platform-standard authentication to task application-unique authentication.

The servlet 302 shown in FIG. 3 is a program that provides web services in the web server 101 to the client terminals C. The J2EE-class library 303 is a class library related to the servlet 302, monitors the user authentication request 400 received from one of the client terminals C and, when the user authentication request 400 is in a predetermined pattern, takes out a user ID and correlates the user ID with session identifying information.

Specifically, the J2EE-class library 303 has a user ID definition file 306. The user ID definition file 306 is described in, for example, deployment descriptor web.xml and is a file for defining in advance a method for taking out user IDs from the user authentication request 400 (HTTP request).

In the example shown in FIG. 3, "gyoum1" is defined as a URL and "uid" is defined as a variable. Therefore, when "gyoum1" and "uid" as a variable of "gyoum1" are described in the request, the J2EE-class library 303 interprets the request to be the user authentication request 400 from the one of the client terminals C and correlates the user ID ("user-id" shown in FIG. 3) and the session identifying information ("session" shown in FIG. 3) with a common storage 308. These correlated user ID and session identifying information are recorded also as a servlet log 307.

The common storage 308 retains a user ID corresponding to the session identifying information on the web server 101 and session identifying information corresponding to identifying information for an EJB object (hereinafter, "EJB-object identifying information") that has been notified from the EJB server 300. Because the information exists over plural servers, the information is shared at the storage. However, the sharing of the information may also be realized using communication without using the common storage 308.

At the common storage 308, the servlet container 304 correlates the EJB-object identifying information of the EJB object ("server obj" shown in FIG. 3) notified from an EJB container 313 of the EJB container 313 with the session identifying information ("session" shown in FIG. 3) created in the J2EE-class library 303 on the web server 101. When the user authentication request 400 is issued, the servlet container 304 executes user authentication based on the user ID. When the authentication is completed successfully, identification information including the user ID and a password is transmitted to the EJB container 313 of the EJB server 300.

The add-on security administrative mechanism 305 is add-on middleware for the web server 101 and mediates between the user ID definition file 306 and the common storage, and the J2EE-class library 303 and the servlet container 304. A Web access log 309 and the servlet log 307 on the web server 101 are collected by the administrative server 105.

The EJB server 300 includes an EJB 311, a J2EE-class library 312, the EJB container 313, an add-on security administrative mechanism 314, a Java (trademark)-database-connectivity (JDBC) filter driver 315, a JDBC driver 316, and a policy decision point (PDP) 317.

The EJB 311 is a task application provided by the EJB server 300. The EJB 311 has a system ID for making accesses to the DB server 103 and outputs the system ID together with a structured-query-language (SQL) command contained in a DB access request to the JDBC filter driver 315. The J2EE-class library 312 is a class library related to the EJB 311.

The EJB container 313 notifies identifying information of the EJB object that is a method corresponding to the SQL command (DB access request) from the one of the client terminals C, to the EJB container 313 of the web server 101. The EJB container 313 also correlates JDBC invocation (session identifying information) executed as an extension process of method invocation from the servlet 302 of the web server 101 with the EJB-object identifying information and notifies the JDBC invocation and the EJB-object identifying information to the add-on security administrative mechanism 314.

The add-on security administrative mechanism 314 is add-on middleware for the EJB server 300 (task application server 104). The add-on security administrative mechanism 314 takes out a user ID correlated with an execution unit of the JDBC driver 316 using notification information from the EJB container 313 and the information in the common storage 308 as clues.

The PDP 317 is an entity that assesses a policy and determines approval or disapproval, and determines the validity of the DB access request to the JDBC driver 316 by referring to an access policy repository. An access policy repository 318 is information that defines the access authority of each user/role, limitation of available times for each user/role. A policy administration point (PAP) 319 is an entity that creates and edits the access policy repository.

The JDBC filter driver 315 causes the add-on security administration to determine the validity of a DB access request by the EJB 311 and executes access control based on the result of the determination. For example, when the DB access request is an access request to a table that is not accessible for the user, an exception (SQLException) is thrown. When the DB access request is an access request for a time during which the user can not make accesses, an exception (SQLException) is thrown. When the DB access request is an access request containing a column that the user can not make accesses, the column for which the user has no access authority is replaced by meaningless data and returned.

A DB access log 320 is a log that correlates the DB access request with the user ID, and also records the result of the determination for the access request. The DB access log 320 is collected by the administrative server 105 shown in FIG. 1.

To realize the access control of the DB 130 with the aim of information leakage prevention using the configuration shown in FIG. 3, the EJB 311 uses a user ID that has executed the operation at the originating point of a connection request from the JDBC driver 316 to the DB server 103 when the connection is requested. Specifically, the following is realized in the JBDC filter driver 315.

A connection is established by replacing the user ID with a system ID for DB accesses defined in advance and correlation between the connection and the user ID is maintained. The JDBC filter driver 315 executes access control based on the user ID previously obtained and the access control policy when the DB access is made using the connection as described above.

According to the configuration shown in FIG. 3, the access control can be executed with the JDBC filter driver 315 and the JDBC driver 316 on the side of the EJB server 300 being closed and without touching the EJB container 313. Thus, a simple configuration can be realized as a whole. The overhead can be minimized because mapping of the user ID and the DB access request is easy. Even when a fine access control for each user ID is enabled in the DB server 103 in the future, the task application is highly flexible because the task application needs no modification.

Figure 5:
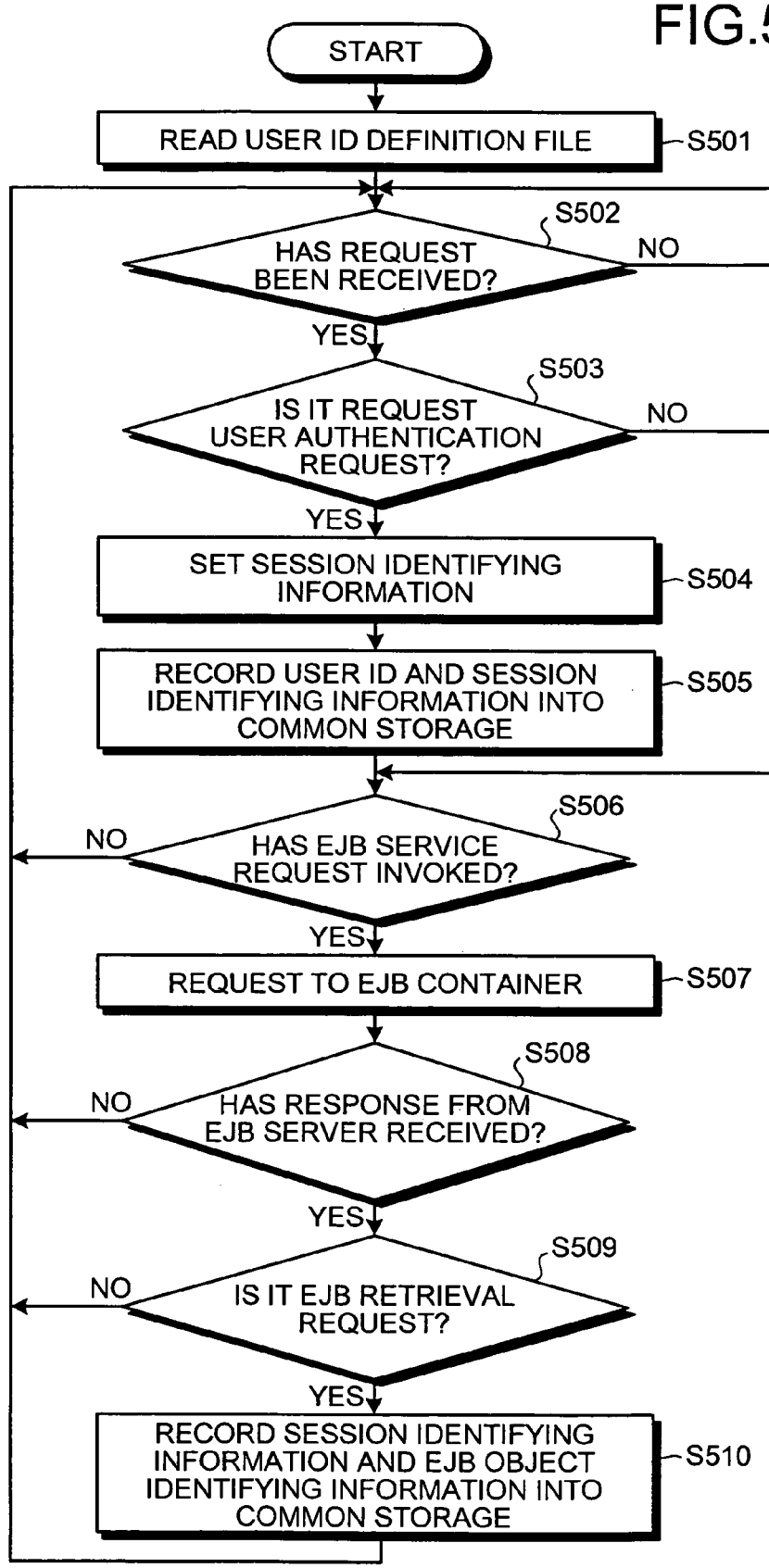
FIG. 5 is a flowchart of a recording process in an audit trail (log) in a web server shown in FIG. 3.

FIG. 5 is a flowchart of a recording process in the audit trail in the web server 101. The web server 101 reads the user ID definition file 306 (step S501). The web server 101 waits for reception of a request (step S502: NO). When the request is received from one of the client terminals C (step S502: YES), the web server 101 determines whether the received request is the user authentication request 400 using the user ID definition file 306 which has been read (step S503).

When the received request is not the user authentication request 400 (step S503: NO), the process proceeds to step S506. On the other hand, when the received request is the user authentication request 400 (step S503: YES), session identifying information indicating the session is set (step S504). The combination of the user ID and the session identifying information contained in the user authentication request 400 is recorded into the common storage 308 (step S505).

Then, it is determined whether an EJB service request is invoked in the servlet 302 (step S506). When the EJB service request is not invoked (step S506: NO), the process returns to step S502.

On the other hand, when the EJB service is invoked (step S506: YES), an EJB service is requested to the EJB container 313 of the EJB server 300 (step S507). Then, it is determined whether a response from the EJB server 300 is received (step S508). When no response is received for a predetermined time period (step S508: NO), the process returns to step S502. On the other hand, when a response is received (step S508: YES), it is determined whether the response is an EJB object search request (step S509). When the response is not an EJB object search request (step S509: NO), the process returns to step S502.

On the other hand, when the response is an EJB object search request (step S509: YES), the combination of EJB-object identifying information contained in the EJB object search request and the session identifying information set at step S504 is recorded into the common storage 308 (step S510). The process returns to step S502. According to this recording process by the web server 101, a user ID and an EJB-object identifying information can be correlated using the session identifying information and the user ID can be traced from the EJB-object identifying information.

Figure 6:
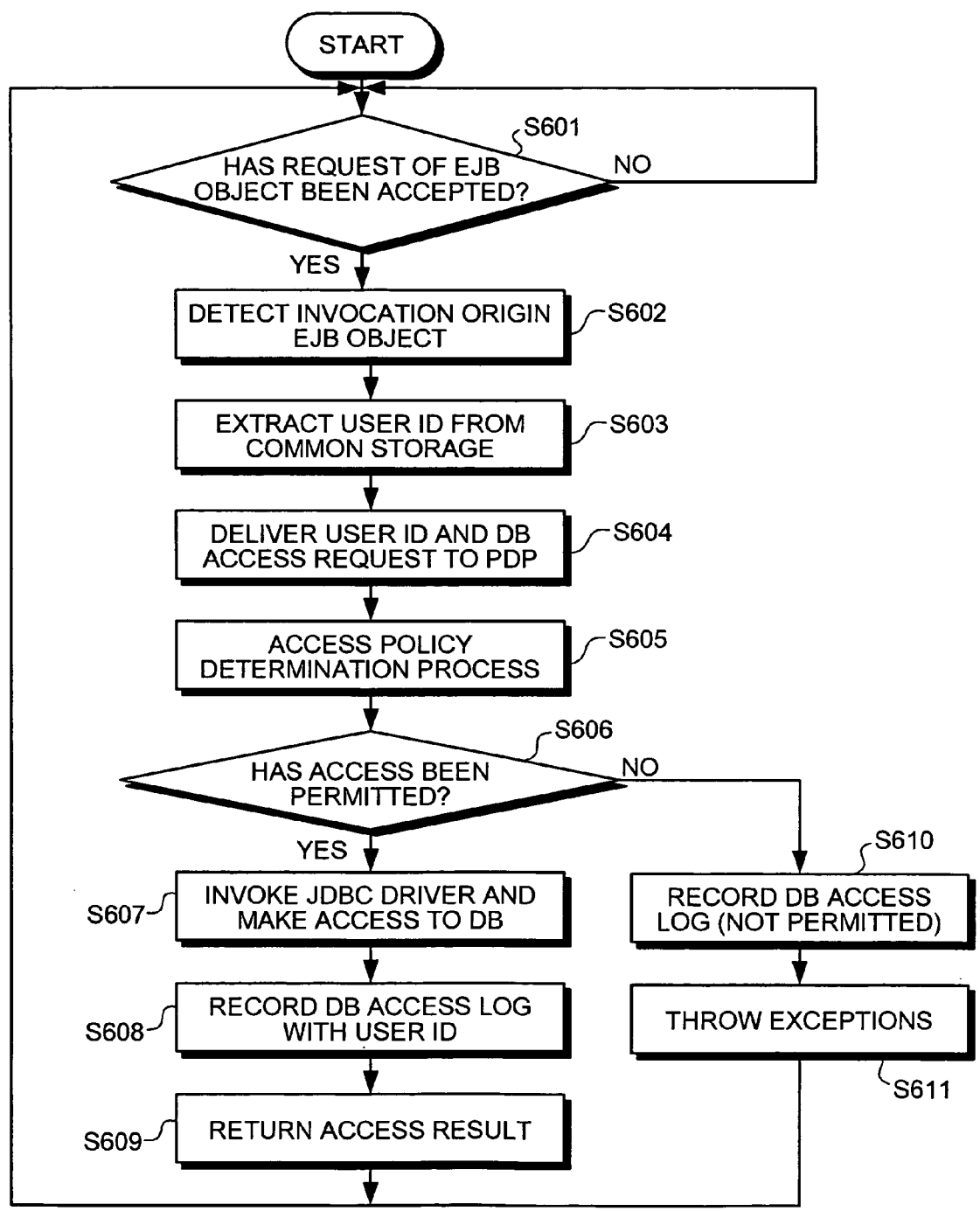
FIG. 6 is a flowchart of the recording process in the audit trail in an Enterprise JavaBeans (EJB) (trademark) server shown in FIG. 3.

FIG. 6 is a flowchart of the recording process in the audit trail in the EJB server 300. It is determined whether a request of the EJB object is accepted by the EJB 311 filter driver (step S601). Next, a process is executed by the add-on security administrative mechanism 305 (step S602 to S606). Specifically, an invoker EJB object is detected from the request of the accepted EJB object (step S602).

A user ID that can be correlated with the EJB-object identifying information of the detected EJB object is extracted (step S603). The extracted user ID and DB access request (SQL command) sent through the EJB 311 from the web server 101 are delivered to the PDP 317 located internally (step S604).

As described above, at the PDP 317, an access policy determination process is executed (step S605). When an access is permitted by this access policy determination process (step S606: YES), the JDBC driver 316 is invoked by the JDBC filter driver 315 and an access is made to the DB 130 with the DB access request (SQL command) (step S607). Specifically, a system ID is issued and sent together with the SQL command to the DB server 103.

Information (the date and time of the access, the system ID, an access permission flag, an access target data name, the access target data amount, the time period of the access, etc.) about an access to the DB server 103 is recorded together with the user ID as a DB access log by the JDBC filter driver 315 (step S608) and the result of the access (DB access log) is returned to the administrative server 105 shown in FIG. 1 (step S609).

On the other hand, when the access is not permitted (step S606: NO), a DB access log (the date and time of the access, the system ID, an access non-permission flag, etc.) that indicates that the access is not permitted is recorded (step S610) and an exception throw is executed to the one of the client terminals C (step S611).

When the DB server 103 has received the access (the system ID and the SQL command) at step S607, the DB server 103 determines whether the issuer of the system ID has the access right, by authenticating the system ID. When it is determined that the issuer has the access right, the DB server 103 searches the DB 130 according to the SQL command. The result of the search provides through the EJB server 300 and the web server 101 to the client terminal C for which the user ID has been authenticated. The DB server 103 records a log (access right operation log) relating to the operation of this access right.

Figure 7:
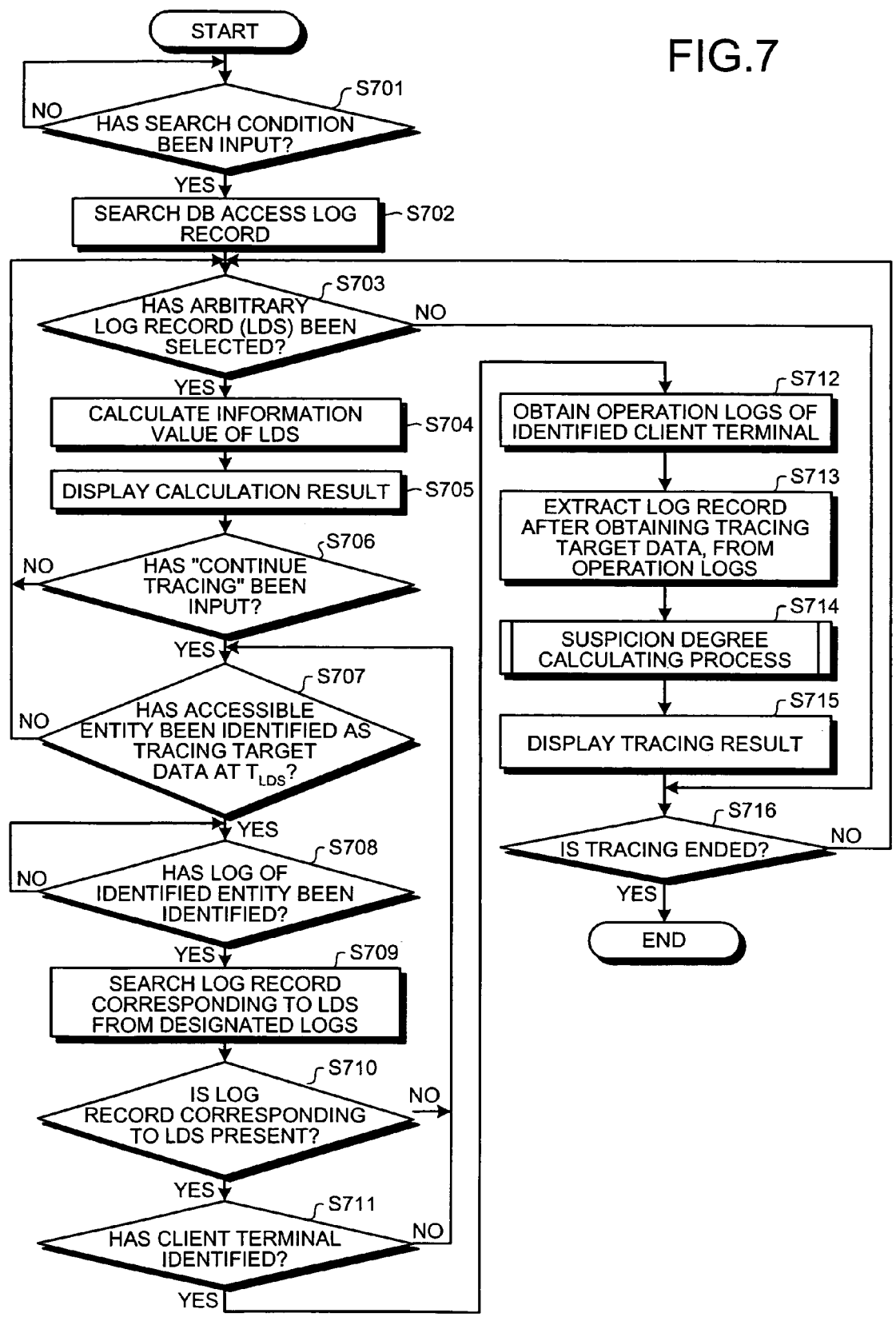
FIG. 7 is a flowchart of a tracing process in the audit-trail in an administrative server according to the embodiment.

FIG. 7 is a flowchart of a tracing process in the audit trail in the administrative server 105. As shown in FIG. 7, input of search conditions from the administrator terminal 110 is waited for (step S701: NO). The search conditions include, for example, the date and time of the access, a system ID, an access permission flag, an access target data name, the access target data amount, the time period of the access, and a user ID.

When the result of the search has been input (step S701: YES), a DB access log record which meets the input search conditions is searched from the DB access log 320 (step S702). Selection of an arbitrary DB access log record (hereinafter, "LDS") by inputting the operation of the administrator terminal 110 from a set of the DB access log records that are the result of the search is waited for (step S703). When no LDS is selected (step S703: NO), the process proceeds to step S716.

On the other hand, when the LDS is selected (step S703: YES), the information value of the LDS is calculated (step S704). The information value is a value that is obtained by, for example, multiplying the importance weighted by columns of the LDS (the date and time of the access, the system ID, an access permission flag, an access target data name, an access target data amount, the time period of access, a user ID, etc.) by the number of rows of the column. The result of the calculation is displayed on the display screen of the display 208 (step S705).

The administrator refers to the calculation result on the display and waits for input of "tracing continuation" (step S706). For example, when a "stop tracing" button on the display screen is pressed, an input of tracing continuation is recognized not to be input (step S706: NO), the process returns to step S703 and selection of a new LDS is waited. On the other hand, when a "continue tracing" button is pressed, the input of tracing continuation is recognized to be input (step S706: YES) and the process is advanced to step S707.

At step S707, at a recording time (time stamp) $T_{LDS}$ of the LDS, entities such as applications, services, the client terminals C that can make accesses to the tracing target data are identified by referring to the access right administration operation log of the DB server 103. When no entities are identified (step S707: NO), the process returns to step S703 and selection of a new LDS is waited.

On the other hand, when entities are identified (step S707: YES), designation of a log of the identified entities by inputting of operation of the administrator terminal 110 is waited (step S708: NO). When a log is designated (step S708: YES), log record corresponding to the LDS is searched from the designated log (step S709).

For example, when log record that records a date and a time that are after the date and the time recorded in the LDS is present in the designated log, the log record is extracted from the designated log as the log record corresponding to the LDS. Similarly, when a log record having a data amount that is same as the data amount of the target to be traced recorded in the LDS is present in the designated log, the log record is extracted from the designated log as the log record corresponding to the LDS.

When no log record corresponding to the LDS is present (step S710: NO), the process returns to step S707. On the other hand, when log record corresponding to the LDS is present (step S710: YES), whether one of the client terminals C that is a candidate target to be traced is identified is determined (step S711). Specifically, for example, when the user ID is contained in the searched log record, one of the client terminals C having the user ID is identified as the one of the client terminals C that is the candidate target to be traced.

Even when the user ID is not recorded directly in the searched log record, the user ID correlated by the common storage 308 can be detected when the EJB-object identifying information is recorded as the EJB server 300 shown in FIG. 3. In this case, one of the client terminals C having the user ID correlated by the common storage 308 is identified as the client terminal C that is the candidate target to be traced.

When the client terminal C that is the candidate target to be traced is identified (step S711: YES), the operation log of the identified client terminal C is obtained (step S712). The log record after the time of obtaining the tracing target data is extracted from the obtained operation log (step S713). Then, based on the extracted log record, a suspicion-degree calculating process relating to the user of the identified client terminals C is executed (step S714). When the client terminal C is not identified (step S711: NO), the process returns to step S707.

Figure 8:
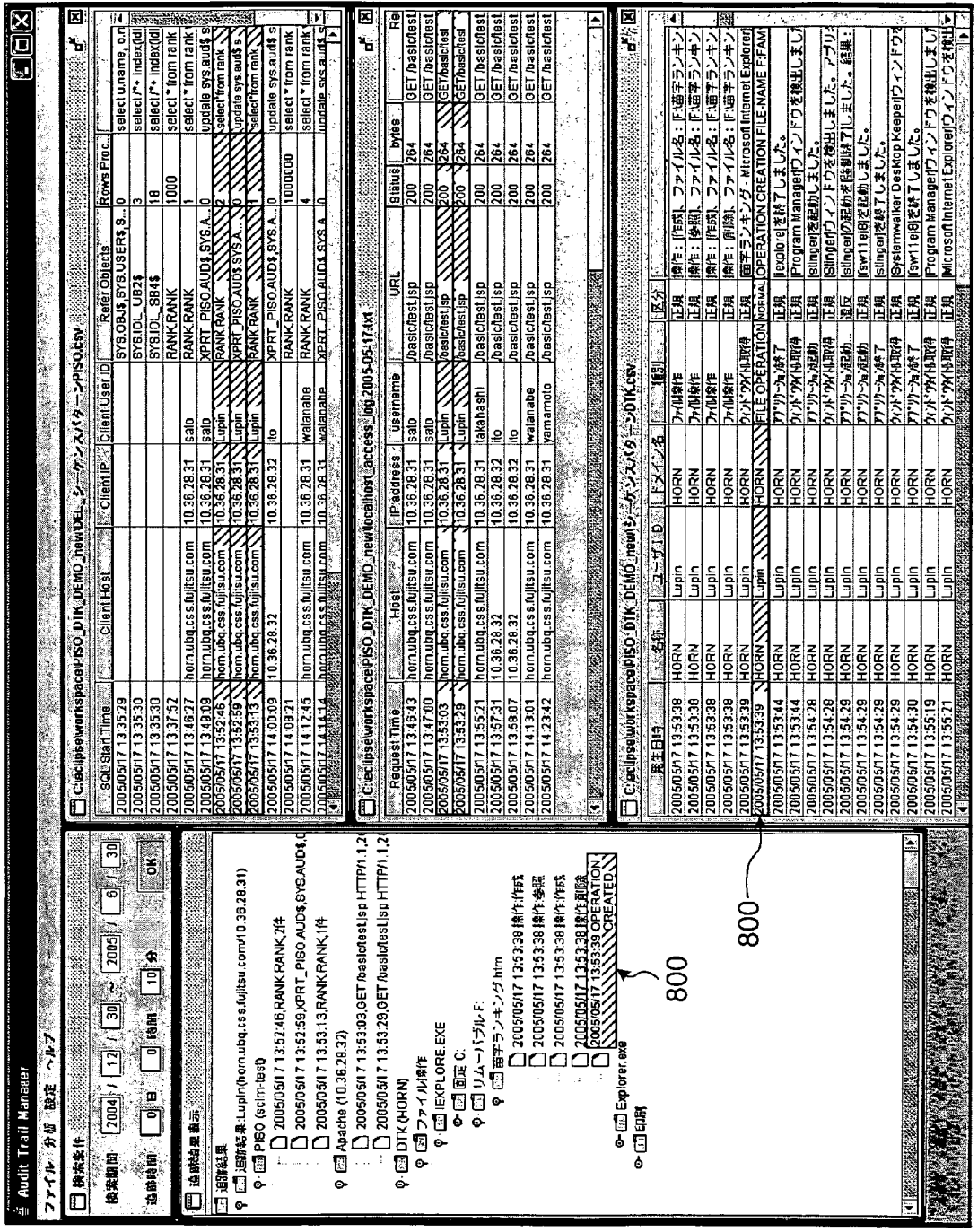
FIG. 8 is a schematic of a display screen showing a tracing result.

The result of the tracing is displayed based on the suspicion degree of the user of the identified one of the client terminals C (step S715). FIG. 8 is schematic of a display screen showing a tracing result. According to FIG. 8, a log record 800 having the suspicion degree above a threshold is highlighted. When tracing is executed using another DB access log record after this screen (step S716: NO), the process returns to step S703.

On the other hand, when the tracing is not executed and is ended (step S716: YES), the series of process are finished. According to this tracing process, the pass to be traced from the tracing target data to the client terminals C can be searched.

FIG. 9 is a table of a mark allocation of suspicion degree of operations. FIG. 10 is a table of a mark allocation of suspicion degree for consecutive operations, and FIG. 11 is a table of weighted coefficients of suspicion degree.

In FIG. 9, the characters "a" to "g" on the left end are identification (ID) characters for identifying operations and the numbers on the right end indicate the marks of those operations. For example, an operation having the ID character "c" is "printing" and the marks given to this operation is "8". Therefore, "8" as the marks is read when the content of the operation recorded in the log record is "printing".

The mark allocation table of FIG. 10 is a mark allocation table of the marks to be added when operations are performed consecutively. For example, consecutive operations "b to f" from an operation denoted by the ID character "b" to an operation denoted by the ID character "f" represents that "a data file is stored into a browser, (the location of storage is not a removable disk)", and then, "an e-mail with a file attached to it is transmitted" and the marks to be added to these consecutive operations are "3" according to the right end column of FIG. 10.

Figures 11, 12:
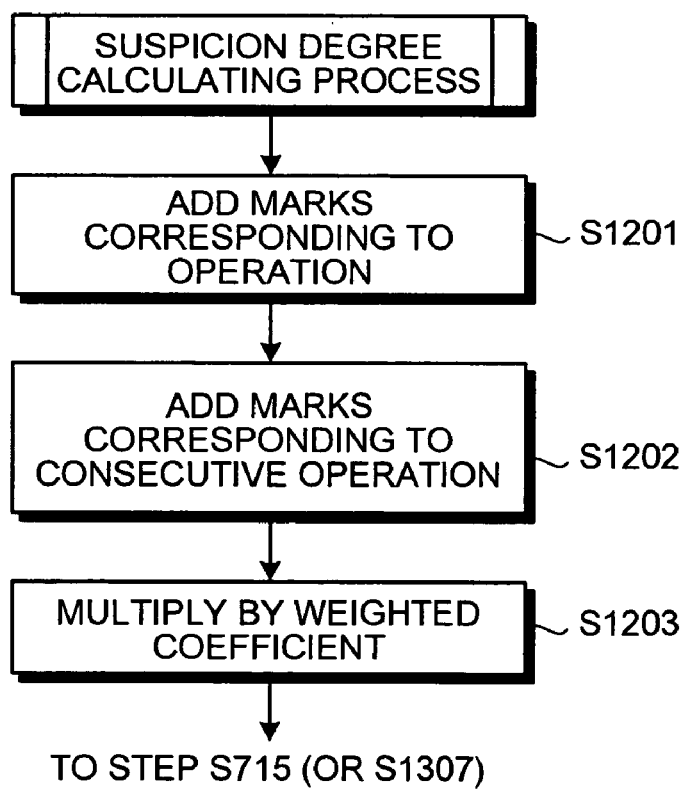
FIG. 11 is a table of weighted coefficients of suspicion degree.
FIG. 12 is a flowchart of a suspicion-degree calculating process.

According to the weighted coefficients shown in FIG. 11, when the date and time of recording (time stamp) of operation log record coincides with a time shown in FIG. 11, the coefficient corresponding to the time is read. For example, when a time stamp is "within the overtime work hours", a coefficient "1.2" is read.

FIG. 12 is a flowchart of a calculating process of the suspicion-degree at step S714.

When operations recorded in log record is "c→d→e→a→g→b→f→c". The mark corresponding to the content of operation recorded in the log record is extracted from the mark allocation table shown in FIG. 9 and is added (step S1201). For example, for the above operation "c→d→e→a→g→b→f→c", the marks are "8, 4, 3, 10, 5, 5, 5, 8". Therefore, "48" is obtained by adding those marks.

The marks corresponding to the content of the consecutive operations recorded in the log record is extracted from the mark allocation table shown in FIG. 10 and is added (step S1202). For example, because the consecutive operations "d→e" and "b→f" shown in FIG. 10 are included in the above operations "c→d→e→a→g→b→f→c", "54" marks are obtained by adding "3" marks for the consecutive operations "d→e" and "3" marks for the consecutive operations "b→f" to "48" marks calculated at step S1201.

The weighted coefficient corresponding to the time stamp recorded in the log record is extracted from the coefficient table shown in FIG. 11 and is multiplied by the marks calculated at step S1202 (step S1203). For example, when the date and the time indicated by the time stamp is "within the overtime work hours", "64" marks is obtained by multiplying the "54" marks by the coefficient "1.2" calculated at step S1202.

As described above, by identifying the client terminals C that has made an access to the DB 130 based on various audit trails in the information system 100, the user of the one of the client terminals C can be screened as candidate suspicious persons who may have leaked information. By obtaining a suspicion degree by analyzing the operation log of the client terminal C, a suspicious person can be identified from the candidate suspicious persons.

Figure 13:
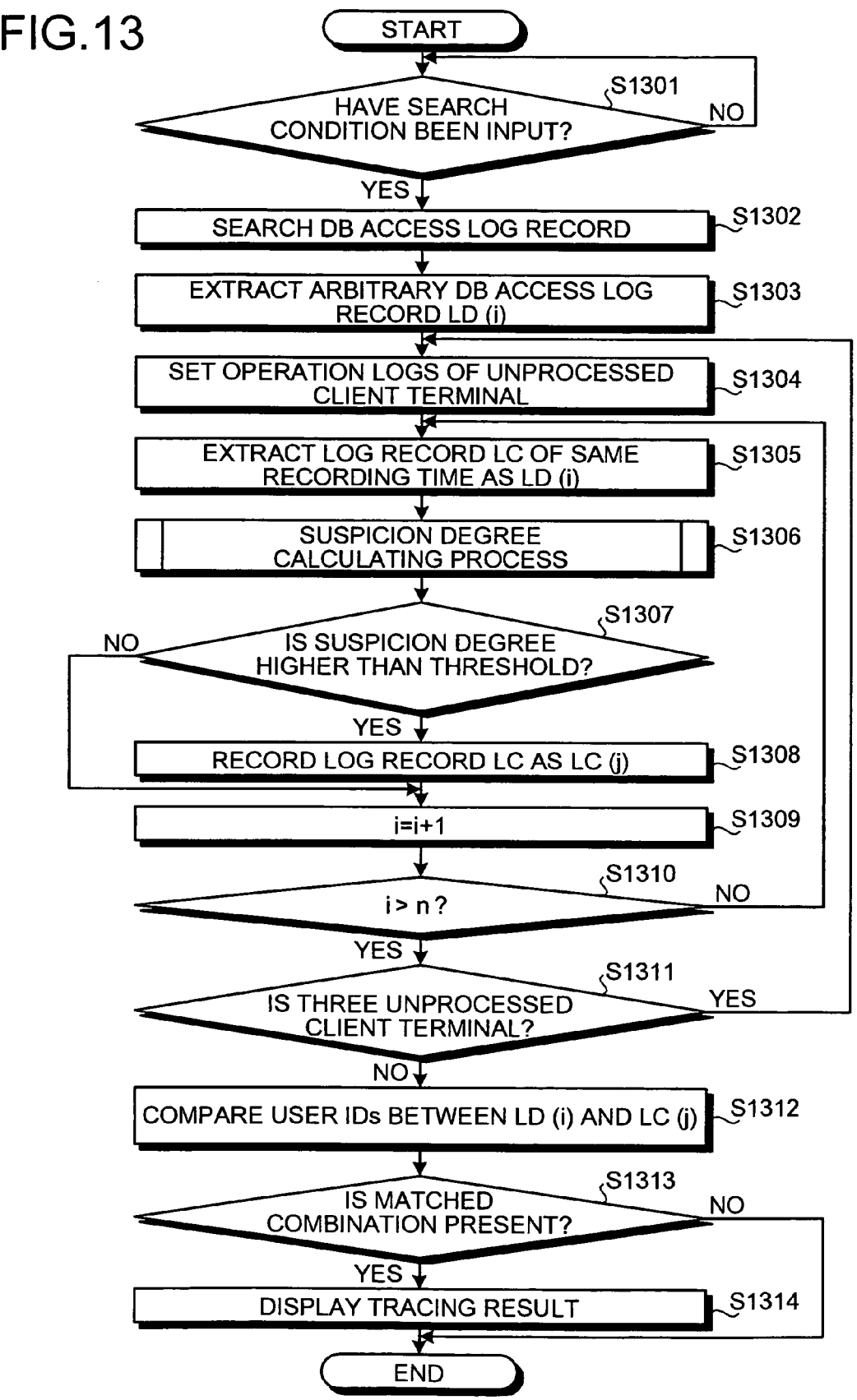
FIG. 13 is a flowchart of another tracing process in the audit trail in the administrative server according to the embodiment.

FIG. 13 is a flowchart of another tracing process in the audit trail in the administrative server 105. In FIG. 13, input of search conditions from the administrator terminal 110 is waited (step S1301: NO). As the search conditions, the date and time of the access, the system ID, an access permission flag, an access target data name, an access target data amount, the time of the access, and the user ID can be listed.

When the search conditions are input (step S1301: YES), a DB access log record that meets the input search conditions is searched from the DB access log 320 (step S1302). An arbitrary DB access log record LD (i) (i=1, 2, . . . , n) is extracted from n pieces of DB access log records LD that are the search result (step S1303).

Then, an unprocessed operation log of the one of the client terminals C is set (read) (step S1304) and log records LC for the recording time that is same as the date and the time indicated by the time stamp of the log record LD (i) is extracted from the set operation log (step S1305). And then, a suspicious degree calculating process shown in FIG. 12 is executed as to the extracted log record LC (step S1306). When the calculated suspicious degree is not higher than a threshold (step S1307: NO), the process proceeds to step S1309.

On the other hand, when the calculated suspicious degree is higher than the threshold (step S1307: YES), the log record LC is recorded as a log record LD (j) (j=1, 2, . . . , m) (step S1308). "j" is incremented (step S1309), and when i>n is not satisfied (step S1310: NO), the process returns to step S1305. On the other hand, when i>n is satisfied (step S1310: YES), it is determined whether there is an unprocessed client terminal C (step S1311). When there is an unprocessed client terminal C (step S1311: YES), the process returns to step S1304.

On the other hand, when there is no unprocessed client terminal C (step S1311: NO), user IDs are compared between the n pieces of log record LD (i) and m pieces of log record LC (j) (step S1312). Specifically, the user ID recorded in the log record LD (i) and the user ID recorded in the log record LC (j) are compared to determine whether there is a match.

When a combination of the log record LD (i) and LC (j) of which user IDs match with each other is present (step S1313: YES), this means that the log record LC (j) is traced from the log record LD (j), and the log record LD (i) containing the user ID for which the match has been confirmed is displayed as the tracing result (step S1314). When no match is confirmed at step S1312 (step S1313: NO), the series of process are finished.

According to this tracing process in the audit trail, by checking the tracing target data with the operation at the client terminals C, the one of the client terminals C that has leaked the tracing target data can be identified.

When a combination of a log record LD (i) and LC (i) of which the user IDs match with each other is present (step S1313: YES), the log record LD (i) may be regarded as an LDS and the audit trail tracing process shown in FIG. 7 may be executed starting from step S704. In this case, when the log record extracted at step S713 is the log record LC (j) of which the user ID match with the user ID recorded in the log record LD (i), reaching from the log record LD (i) to the log record LC (j) can be confirmed.

Figure 14:
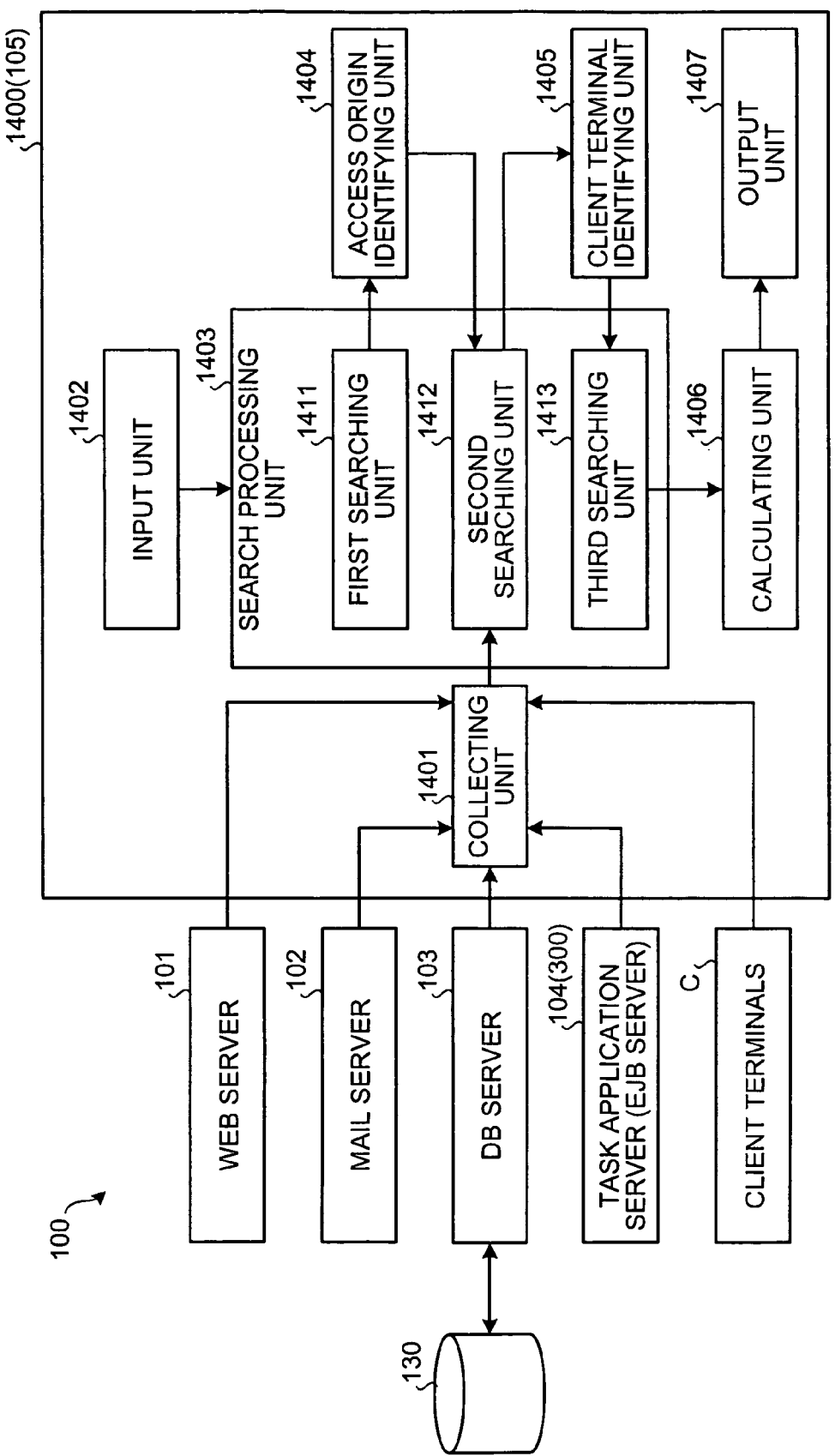
FIG. 14 is a block diagram of an audit-trail tracing apparatus according to the embodiment.

FIG. 14 is a block diagram of an audit-trail tracing apparatus according to an embodiment of the present invention. An audit-trail tracing apparatus 1400 includes a collecting unit 1401, an input unit 1402, a search processing unit 1403, an access origin identifying unit 1404, a client terminal identifying unit 1405, a calculating unit 1406, and an output unit 1407, and corresponds to the administrative server 105.

The collecting unit 1401 collects web access logs recorded by the web server in the information system 100, transmission/reception logs recorded by the mail server 102, access right operation logs recorded by the DB server 103, logs (for example, the DB access logs 320 shown in FIG. 3) recorded by the task application server 104, operation logs of the client terminals C, and other common storages 308.

The input unit 1402 accepts input of search conditions relating to the tracing target data stored in the database. Specifically, the input unit 1402 executes, for example, the input process shown at step S701 of FIG. 7.

The search processing unit 1403 includes a first searching unit 1411, a second searching unit 1412, and a third searching unit 1413. The first searching unit 1411 searches a first log record that meets the search conditions input by the input unit 1402 from access logs recorded when accesses are made to the database. Specifically, the search process of the DB access log record shown at step S702 of FIG. 7 is executed.

The access origin identifying unit 1404 identifies access origins that can make accesses to the tracing target data on the date and at the time of the first log record, based on the first log record. Specifically, on the date and at the time of recording $T_{LDS}$ indicated by the time stamp of the DB access log record shown at step S702, access origins that can make accesses to the tracing target data, for example, the web server 101, the mail server 102, and the task application server 104 other than the client terminals C and the DB server 103 are identified. More specifically, the identifying process shown at step S707 of FIG. 7 is executed.

The second searching unit 1412 searches the second log record corresponding to the first log record, from the logs of the access origin identified by the access origin identifying unit 1404. Specifically, the search process of the log record (the second log record) corresponding to the LDS shown at step S709 is executed.

The client terminal identifying unit 1405 identifies a client terminals C that has made an access to the tracing target data based on the second log record. Specifically, the identifying process shown at step S711 is executed.

The third searching unit 1413 searches the third log record for the time period after the client terminal C has obtained the tracing target data, from the operation log of the client terminal C identified by the client terminal identifying unit 1405. Specifically, the extraction process of the log record shown at step S713 is executed.

The calculating unit 1406 calculates the suspicion degree of the user that has operated the client terminal C based on the third log record. Specifically, the suspicion-degree calculating process shown at step S715 (steps S1201 to S1203 of FIG. 12) is executed.

The output unit 1407 outputs the tracing result of the tracing target data based on the result of calculation by the calculating unit 1406. Specifically, the display process of the tracing result shown at step S715 is executed and a display screen of the tracing result shown in FIG. 8 is displayed on the display 208.

The collecting unit 1401, the input unit 1402, the search processing unit 1403, the access origin identifying unit 1404, the client terminal identifying unit 1405, the calculating unit 1406, and the output unit 1407 respectively realize their own functions by, for example, the CPU 201 or the I/F 209 executing programs recorded on a recording medium, such as the ROM 202, the RAM 203, and the HD 205 shown in FIG. 2.

FIG. 15 is a block diagram of the audit-trail tracing apparatus. Like reference characters are given to like components in FIGS. 14 and 15 and explanation for those components will be omitted.

As shown in FIG. 15, an audit-trail tracing apparatus 1500 includes the collecting unit 1401, the input unit 1402, a search processing unit 1501, a comparing unit 1502, a calculating unit 1503, a determining unit 1504, and an output unit 1505, and corresponds to the administrative server 105 shown in FIG. 1.

The search processing unit 1501 includes a first searching unit 1511 and a second searching unit 1512. The first searching unit 1511 searches the first log record that meets search conditions input by the input unit 1402, from access logs recorded when an access has been made to the database. Specifically, the searching process of the DB access log record (the first log record) shown at step S1302 is executed.

The second searching unit 1512 searches the second log record having the date and the time of recording contained in the time of the date and the time of recording of the fist log record searched by the first searching unit 1511, from the operation logs of the client terminals C. Specifically, the extraction process of the log record LC (the second log record) shown at step S1305 is executed.

The comparing unit 1502 compares the user identifying information recorded in the first log record and the user identifying information in the second log record. Specifically, the comparing process shown at step S1312 is executed.

The output unit 1505 outputs the tracing result of the tracing target data based on the result of comparison by the comparing unit 1502. Specifically, for example, the display process of the tracing result shown at step S1313 and step S1314 is executed, and the display screen of the tracing result shown in FIG. 8 is displayed on the display 208.

The calculating unit 1503 calculates the suspicion degree of the user that has operated the client terminal C based on the second log record. Specifically, the suspicion-degree calculating process shown at step S1306 (steps S1201 to S1203 of FIG. 12) is executed for the log record LC that is the second log record.

The determining unit 1504 determines whether the suspicion degree is higher than a threshold. Specifically, the determining process shown at step S1307 is executed. In this case, the comparing unit 1502 compares the user ID of the first log record and the user ID of the second log record based on the result of the determination, that is, regarding a log record LC having the suspicion degree that is higher than the threshold as the second log record.

Functions of the collecting unit 1401, the input unit 1402, the search processing unit 1501, the comparing unit 1502, the calculating unit 1503, the determining unit 1504, and the output unit 1505 are realized by the CPU 201 or the I/F 209 executing programs recorded on a recording medium, such as the ROM 202, the RAM 203, and the HD 205 shown in FIG. 2.

As described above, according to the embodiment, a malicious user in the information system 100 (for example, a customer information searching system) makes an access using the information system 100 from one of the client terminals C of the user to the DB 130, downloads some customer information in the DB 130, and transmits the downloaded customer information to a personal computer of the user by an e-mail. When the leakage of the customer information is disclosed, the administrator makes an access from the administrator terminal 110 to the administrative server 105 and can trace the user that has leaked the information and a history of a series of operation related to information leakage.

As described above, according to the audit-trail tracing apparatus, the audit trail tracing method, the audit trail tracing program, and the recording medium, collection and analysis of the logs are facilitated, thereby efficiently tracing logs. Thus, it is possible to obtain an efficient deterrent to information leakage.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus comprising:
a computer processor to:
receive a search condition for tracing an access to target data stored in a database;
search, from among access logs that are recorded in the database in response to accessing to the database, a first log that meets the search condition;
identify, based on the first log, a server from which the access to the target data has been possible at a time identical to a time recorded in the first log;
search, from among log records stored on the server, a second log corresponding to the first log;
identify a client that has made the access to the target data, based on the second log;
search, from among operation logs of the client stored in a storage of the client, an operation log that is recorded after the client has obtained the target data; and
output a result of tracing the access to the target data, based on the searched operation log.

2. The apparatus according to claim 1, wherein:
a user identification (ID) of the client is correlated to a session ID of the first log;
the server is correlated to the session ID; and
the user ID is traced from the server.

3. The apparatus according to claim 1, wherein the computer processor identifies the server by referring to an access right administration operation log.

4. The apparatus according to claim 1, wherein the computer processor calculates a suspicion degree of the client based on the operation log.

5. The apparatus according to claim 4, wherein the computer processor calculates the suspicion degree based on an operation recorded in the operation log.

6. The apparatus according to claim 4, wherein the computer processor calculates the suspicion degree based on consecutive operations recorded in the operation log.

7. The apparatus according to claim 4, wherein the computer processor calculates the suspicion degree based on an operation time recorded in the operation log, the operation time at which an operation is performed.

8. A computer-implemented method utilizing a computer processor for performing an audit trail, comprising:
- receiving a search condition for tracing an access to target data stored in a database;
- searching, from among access logs that are recorded in the database in response to accessing to the database, a first log that meets the search condition;
- identifying, based on the first log, a server from which the access to the target data has been possible at a time identical to a time recorded in the first log;
- searching, from among log records stored on the server, a second log corresponding to the first log;
- identifying a client that has made the access to the target data, based on the second log;
- searching, from among operation logs of the client stored in storage of the client, an operation log that is recorded after the client has obtained the target data; and
- outputting a result of tracing the access to the target data, based on the searched operation log.

9. A non-transitory computer-readable storage medium that stores a program causing a computer to execute a procedure, the procedure comprising:
- receiving a search condition for tracing an access to target data stored in a database;
- searching, from among access logs that are recorded in the database in response to accessing to the database, a first log that meets the search condition;
- identifying, based on the first log, a server from which the access to the target data has been possible at a time identical to a time recorded in the first log;
- searching, from among log records stored on the server, a second log corresponding to the first log;
- identifying a client that has made the access to the target data, based on the second log;
- searching, from among operation logs of the client stored in a storage of the client, an operation log that is recorded after the client has obtained the target data; and
- outputting a result of tracing the access to the target data, based on the searched operation log.

* * * * *